Figure 1:
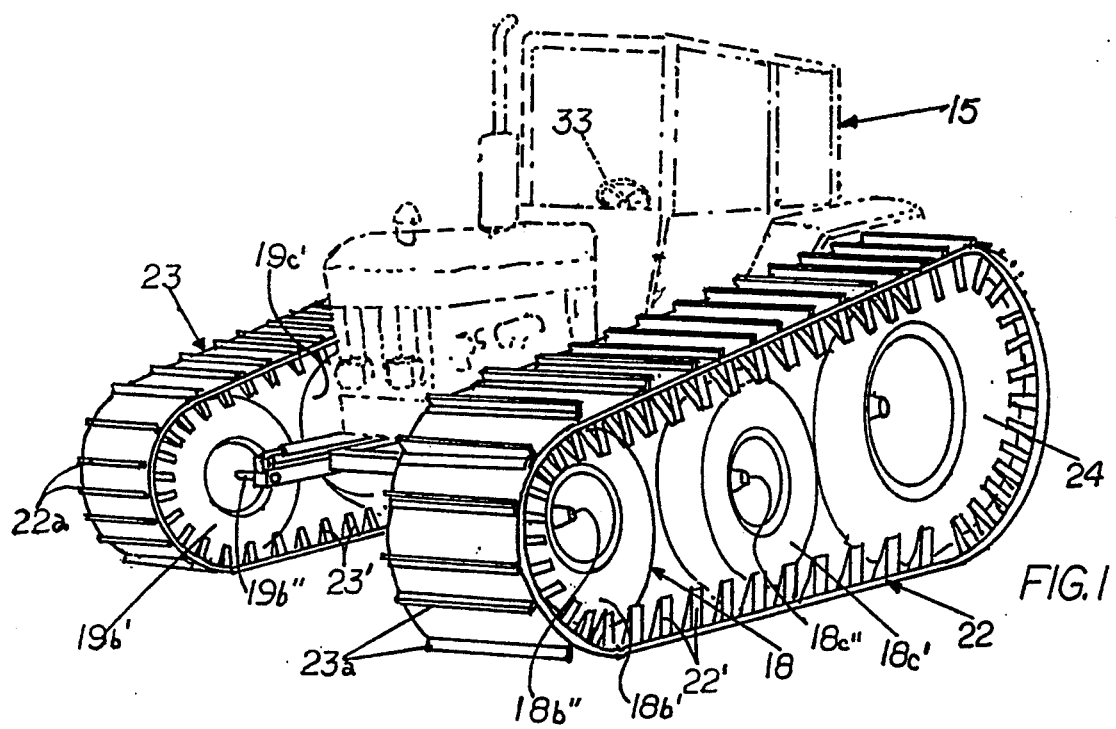

United States Patent [19]

Smith et al.

[11] Patent Number: 5,361,860

[45] Date of Patent: Nov. 8, 1994

[54] CONVERSION UNIT FOR WHEEL-DRIVEN TRACTORS

[76] Inventors: John S. Smith; Scott V. Smith, both of P.O. Box 859, Jackman, Me. 04945

[21] Appl. No.: 62,064

[22] Filed: May 4, 1993

[51] Int. Cl.$^5$ .............................................. B62D 55/04
[52] U.S. Cl. ................... 180/9.21; 180/9.1; 180/9.26; 180/190; 305/35 EB
[58] Field of Search ............... 180/183, 184, 185, 186, 180/190, 9.21, 9.1, 9.26, 9.5, 9.54; 305/29, 35 EB

[56] References Cited

U.S. PATENT DOCUMENTS

| | | | |
|---|---|---|---|
| 3,083,781 | 4/1963 | Carlin et al. | 180/9.5 |
| 3,190,384 | 6/1965 | Dufresne | 180/9.5 |
| 3,476,207 | 11/1969 | Ryan | 180/9.5 |
| 3,710,886 | 1/1973 | Wagner | 180/9.21 |
| 3,847,240 | 11/1974 | Shoup | 180/9.5 |
| 4,120,372 | 10/1978 | Hartwich | 180/9.5 |
| 4,410,219 | 10/1983 | van der Lely | 305/35 EB |
| 4,516,649 | 5/1985 | Braathen | 180/9.1 |
| 4,893,883 | 1/1990 | Satler | 180/9.1 |

Primary Examiner—Mitchell J. Hill
Attorney, Agent, or Firm—Stan Jones

[57] ABSTRACT

A track conversion unit for wheel-driven tractors in which the forward steerable wheels and their axle of the wheel tractor are removed from the wheeled tractor and replaced with tandem wheel units respectively secured to the forward end of the tractor—one at each side—by a bracket attachment for connection therewith. These tandem wheel units include two inflated tires with tread and at each side of the tractor, a crawler track extends about these inflated tires from a regular large size treaded rear drive wheel of the tractor for the purpose of being driven in crawler-like fashion over snowbound and rough terrain areas. With the steerable wheels detached, the tractor with the crawler track treads will be dependent upon the trailing equipment for steering the tractor, which steering equipment will be connected through hydraulic means with the steering wheel of the tractor to be available to the driver.

8 Claims, 3 Drawing Sheets

CONVERSION UNIT FOR WHEEL-DRIVEN TRACTORS

This invention relates to a crawler track conversion unit for wheel-driven tractors to convert the wheeled tractor into a crawler tractor for winter use on snow-covered ground and rough terrain.

An attempt has been made to provide effective attachments for the conversion of the wheeled tractor to a crawler-type tractor. There has been some delay in the construction of such a tractor in that the crawler tracks will collapse on being used. A breakdown of the track intermediate of its length as has been found to occur with a tractor built along the lines of Canadian Patent No. 1,256,474, issued on Jun. 27, 1989. In this patent, there has been shown a tractor in which individual tandem wheel units have relied only on their connection with the tractor body at one point so that they are free to rotate about the single connecting point. In certain conditions of travel, the tandem wheel units will be rotated and turned in a manner to cause the enclosing crawler trackage to collapse over center intermediate their extent between the ends of the tractor. The forward tandem wheel units will rotate about their single pivot connection and break down the full crawler trackage assembly so that the trackage is rendered unuseable with breakdown. This breakdown occurs because there has been inadequate bracing of the tandem wheel conversion units in their connection with the tractor.

According to this invention, the connection of the tandem wheel units, in addition to their central connection, include a rearwardly removed pivot connection with fracture-relieving biasing which restrict rotational movement of the units about their center connection of the unit relative to the body of the tractor. In order to provide on the tractor the removed connecting there has been provided thrust members, one on each side of the tractor, extending forwardly from the rear axle housing of the tractor to which they are detachably connected and from which they extend forwardly to the nose of the tractor and tied together by a cross frame member secured thereto. A restricted and cushioned connection is provided for each tandem wheel unit to the thrust members at a location rearward of the pivot connection. By this means, pivotal breakdown over center movement of the tandem wheel units about their center connection cannot occur. Each tandem wheel unit will be connected at two point locations on the tractor and biasingly restrained against pivotal movement, but allowing enough movement for accommodation of units and their trackage.

OBJECTS OF THE INVENTION

It is thus the principal object of the present invention to provide a wheeled tractor converted to a crawler-type tractor in which the tandem wheel units will have two-point connections to limit their rotation upon their center connection with a tractor body.

It is another object of the invention to provide in a wheeled tractor added members extending forwardly from the rear axle housing available for an the added connection of the tandem wheel units and to which such tandem wheel units will be connected to resist their rotation about their center connection with the tractor body.

It is still another object of the invention to provide in the added connection for the tandem wheel units resistent means to limited tilting movement of the tandem wheel units about their center pivot connection with the body of the tractor thereby to permit adjustment for the crawler trackage to adapt therewith.

It is still another object of the invention to provide a crawler arrangement for wheeled tractors, having the above objects in mind, which is of simple construction, easy to install, can be done at the farm without technical knowledge, utilizes the tread of the large rear wheels for the driving of the crawler track, with minimum parts for effecting dual connection of each tandem wheel unit to the wheel tractor and efficient and effective in use.

DRAWING DESCRIPTIONS

Figure 2:
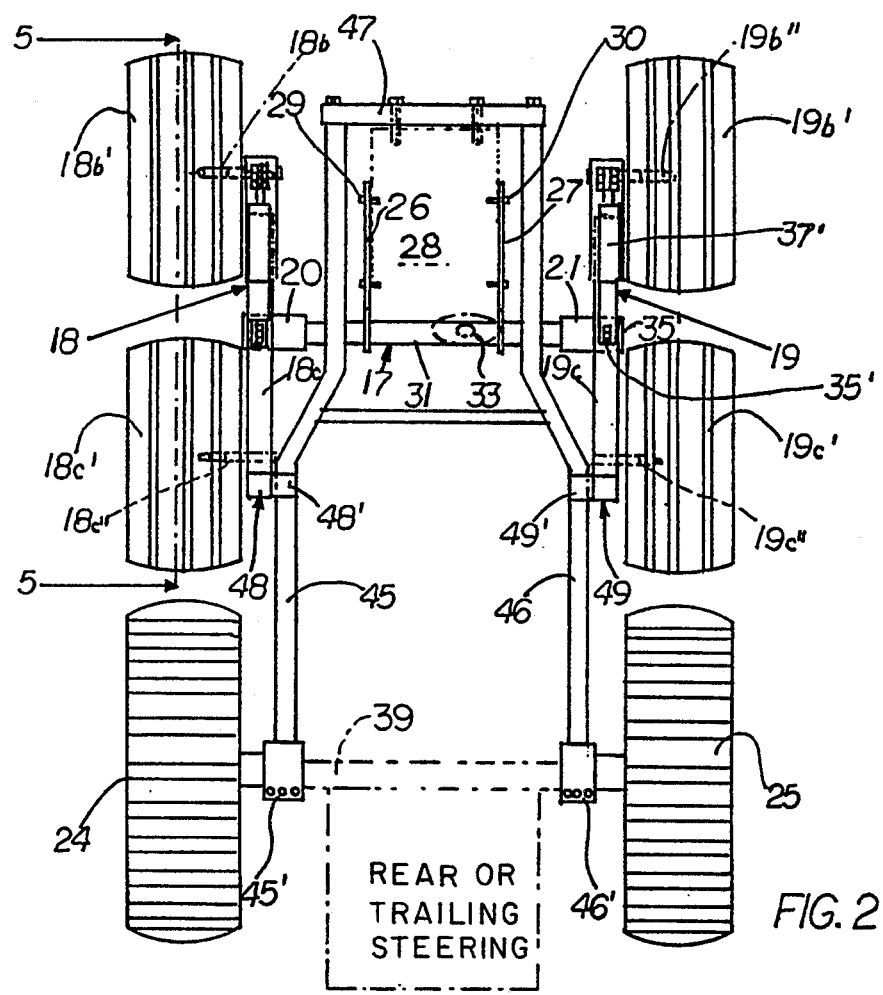
Figure 3:
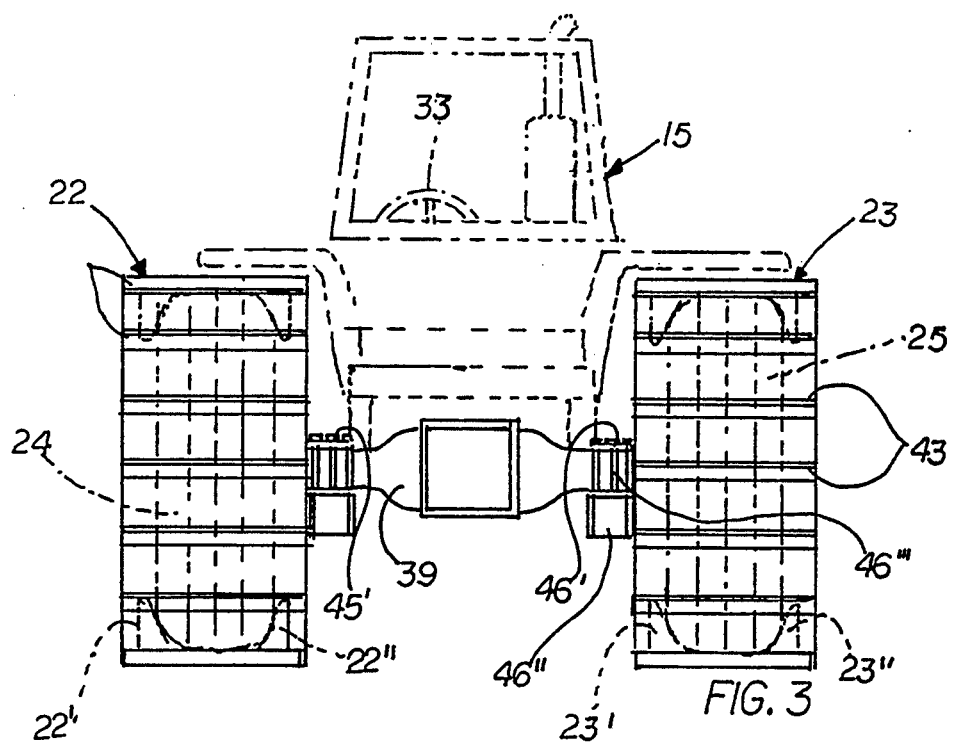
Figure 4:
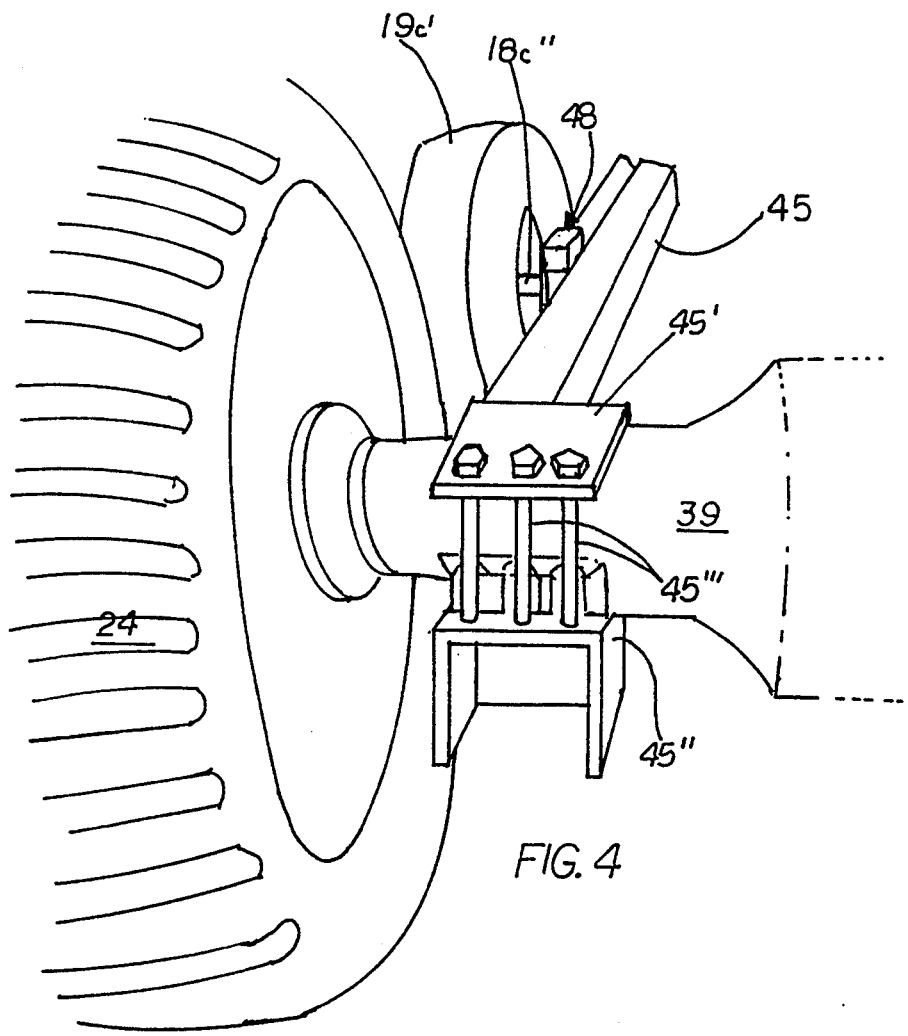
Figure 5:
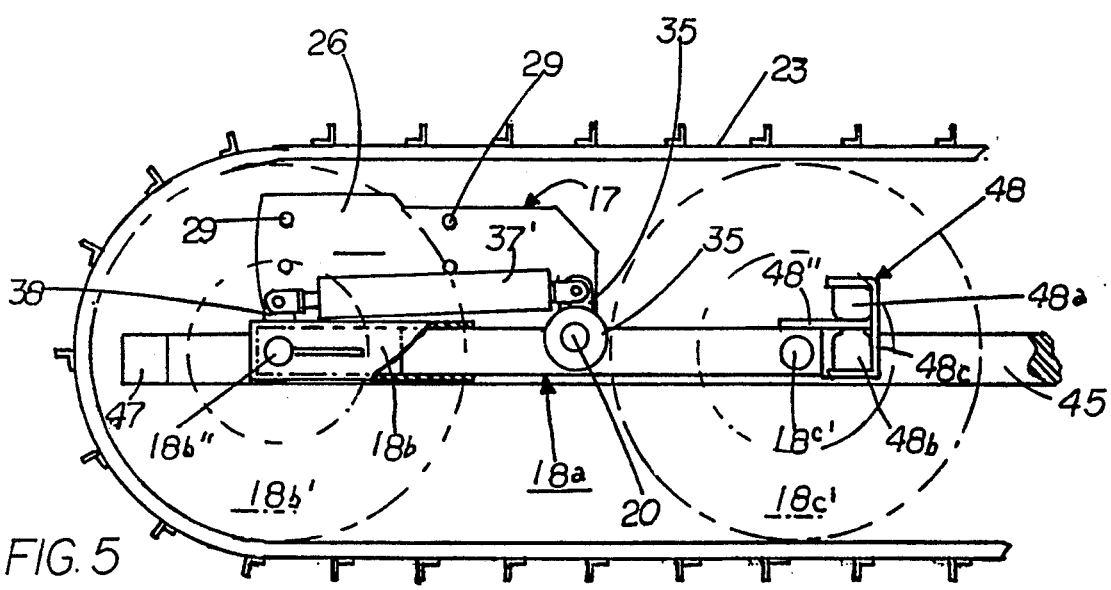
Figure 6:
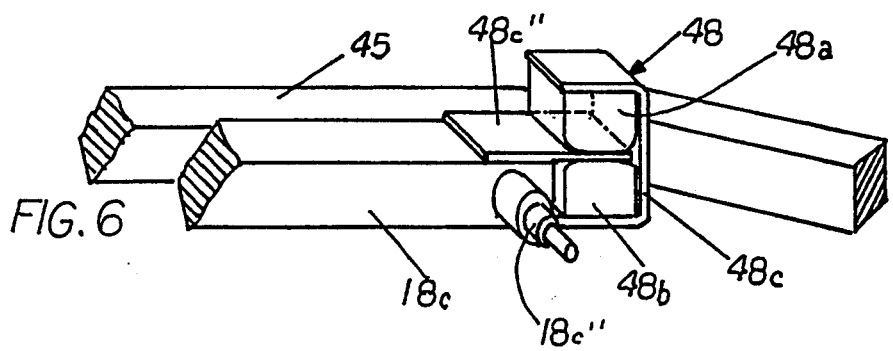
Figure 7:
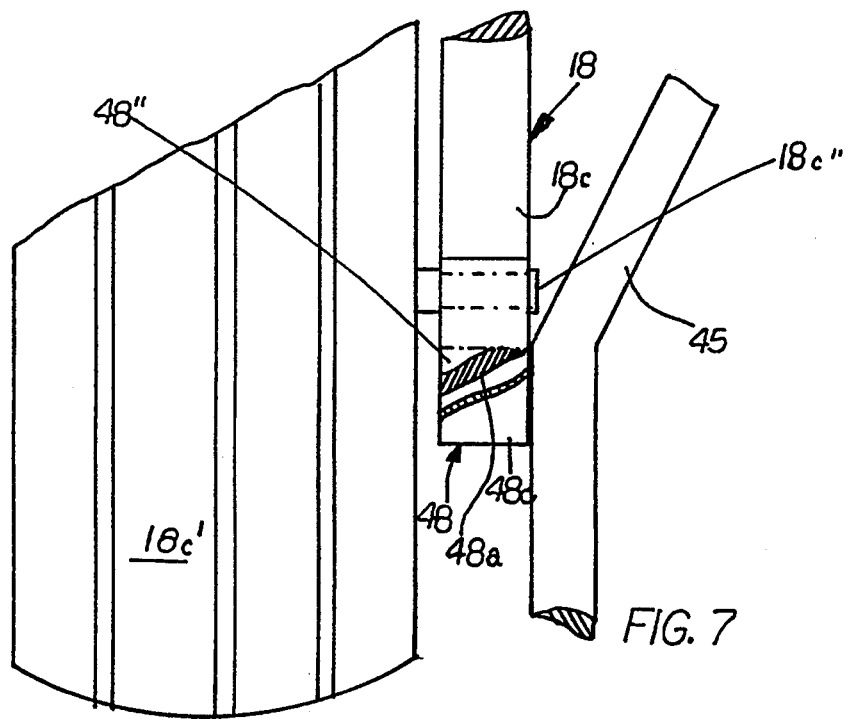

For a better understanding of the invention, reference may be had to the following detail description taken in connection with the accompanying drawing, in which:

FIG. 1 is a front and side perspective view of a wheeled tractor completely equipped with the tandem wheel units and crawler tracks in a manner embodying the features of the present invention, FIG. 2 is a top plan view of the wheeled tractor showing the double connection of the tandem wheel units with the forward end of the tractor and the thrust frame members extending forwardly from the rear axle housing of the tractor for the rear connection with the tandem wheel units thereto to prevent their rotation about their center connections directly connected with the forward part of the tractor, FIG. 3 is a rear elevational view of the complete assembly and looking upon the crawler treads extended over the tractor drive wheels, FIG. 4 is an enlarged fragmentary perspective view of one forwardly-extending thrust member from the rear wheel housing of the tractor, showing the location of the forward connection of a tandem wheel unit therewith, FIG. 5 is an enlarged fragmentary sectional view of the tractor looking in elevation at one of the tandem wheel units and a thrust frame member extending from the tractor rear housing for the connection of the wheel unit with the tractor to resist rotation of the unit about its center connection with the body of the tractor as viewed on Line 5—5 of FIG. 2 with the tires removed, FIG. 6 is an enlarged fragmentary perspective view of the compressable second connection for the tandem wheel unit to the thrust frame member that extends forwardly from the rear axle housing at the left side of the tractor and corresponding to its showing in elevation in FIG. 5, FIG. 7 is an enlarged top plan view of the second connection of the tandem wheel unit with the forwardly-extending thrust frame member.

DETAIL DESCRIPTION

Referring now to the figures, 15 represents a regular wheeled tractor that has been converted into a crawler-type tractor and from which the forward wheel axle and steering structure will have been removed for a connection therewith of a cross bar mounting structure 17 extending about and laterally from the sides of the engine body of the tractor on which tandem wheel units 18 and 19 have been respectively pivotally connected at respective opposite sides thereof at 20 and 21, FIGS. 2 and 5. Continuous crawler tread assemblies 22 and 23 respectively extend over respective rear drive wheels 24 and 25 of the wheel tractor 15 and are driven by the tread thereof. When assembled, the once wheeled tractor 15 can be driven over the snow and rough terrain by the crawler treads and steered from attached trailing equipment in a well known manner.

The cross bar mounting structure 17, FIG. 2, includes bracket plates 26 and 27 adapted to be respectively secured to the respective opposite sides of engine block 28 by bolts 29 and 30 and these bracket plates carry a cross bar or transverse beam 31 at the rear of engine block 28 with which the connections 20 and 21 are respectively made. A steering wheel 33 of the wheeled tractor is no longer used to steer the tractor through forward wheels since they have been removed along with their axles, yet may be used in hydraulic connection with a trailing implement such as a drag to effect steering of the combined assembly of tractor from the trailing implement.

Each tandem wheel unit 18 or 19, one of which will be described and to the other of which corresponding numbers may be supplied, has an elongated support structure 18a or 19a which is best shown in FIGS. 5, 6, and 7. Such support structure includes telescopically-connected forward and rearward members 18b or 19b and 18c or 19c, with 18b being the inner and 18c being the outer telescoped members thereof. Rubber-tired wheels 18b' or 19b' and 18c' or 19c' are respectively journalled at 18b" or 19b" or 18c" or 19c". The telescopic rearward member 18c or 19c is pivotally connected to the transverse beam 31 as indicated at 20 or 21. FIGS. 2 and 5, and thereby fixed against longitudinal movement. Thus telescopic-engaged wheel supports are provided for the tandem units. Through a raised arm 35 or 35' from the pivotal connection 20 or 21, there is connected a double-acting hydraulic cylinder 37 or 37' that is connected through a raised arm 38 or 38' to the forward member 18b or 19b to extend or retract the forward wheel 18b' or 19b' of the tandem wheel unit 18 or 19 within the crawler tread assembly 22 or 23. This cylinder 37 may be a so-called grease cylinder that is used to forcibly slide the support structure 18a as required; to tighten or loosen the endless crawler tread and thus provide for best operation of the converted tractor.

The individual units 18 and 19 and their respective crawler treads 22 and 23 are operable together while being jointly driven over the terrain by their respective tractor rear wheels 24 and 25 from the rear axle structure 39 of the tractor 15. The cross bar structure 17 and the tandem wheel units 18 and 19 and crawler treads 24 and 25 provide the kit of the essential parts for the conversion of the wheeled tractor 15 into a crawler-type tractor for use over snow-covered and rough terrain. The conversion of the tractor is made simple and can be done without need of special tools or technical help.

The width of the tires of the units is the same as the width of the treaded tires of the tractor drive wheels 24 and 25. The crawler tracks 22 and 23 are each made up of rubber track elements, FIG. 1, and through use of the hydraulic cylinder devices 37 and 37' will be given some stretch of the crawler tracks 22 and 23, FIG. 3, to be adjusted to the tread wheels. Spaced inwardly-extending guides 22' and 22" or 23' and 23" are provided on the crawler tracks 22 or 23 to be engaged by the treads of the tractor drive wheels by which the crawler tracks are driven. Cleats 22a or 23a extend across the outer surfaces of the respective crawler tracks 22 or 23 to engage the terrain to effect the driving thereover.

In order to provide for the second connections of the tandem wheel units 18 and 19 to the tractor so as to limit their pivotal or rotational movement, side thrust members 45 and 46 are respectively provided as best seen in FIG. 2. These side frame members 45 and 46, respectively, extend forwardly from the respective opposite sides of rear axle housing 39 of the wheeled tractor 15 where they are connected rigidly therewith by top and bottom parts 45' and 45" or 46' and 46", FIG. 4, clamped together by elongated bolts 45''' or 46''', FIGS. 2 and 4. The side frame thrust members 45 and 46 are separated from each other and extend forwardly beyond the engine block 28 for forward connection with a transverse piece 47 that is fixedly supported across the forward portion of the tractor 15, and are inseparable of the transverse piece 47 and the tractor 15. The joined frame members 45 and 46 narrow forwardly of the points 48' and 49" of their second connections to resist rotation about their center connection therewith. Each tandem wheel unit is provided with the two connections—one directly with the tractor through pivot connections 20 or 21, and the other with the side frame members at 45 or 46 with compressable rubber-like cushioning devices 48 or 49 to resiliently limit pivotal movement about their center pivotal connections 20 or 21 with the transverse beam 31 carried by the bracket plates 26 and 27. A pair of connections for each tandem unit allows the tandem wheel units to terrain-follow on undesirable crawler tracks and thereby prevent their collapse of the crawler tracks upon the tractor body.

To allow such limited rotational movement of the tandem wheel units 18 or 19 each cushioning device 48 or 49 comprises a bottom plate 48' or 49' welded to the side frame member 45 or 46. The wheel unit member 18c or 19c has an extension 48" or 49" that extends between resiliently compressable blocks 48a and 48b as best seen in FIGS. 6, and 7 to allow but limited movement to adapt the wheel units to the crawler track as it is continually driven over the terrain.

It should now be apparent that there has been provided means for eliminating the rotational stress upon a center pivot connection of the tandem wheel units with the tractor to thereby prevent a breakage under certain conditions in the running of the tractor over rough terrain that would tend to break down the tandem wheel units and jackknifing of the crawler trackage.

While various changes may be made in the detail construction, it shall be understood that such changes shall be within the spirit and scope of the invention as defined by the depending claims.

What is claimed is:

1. A tractor conversion kit for converting a wheel-driven tractor having a pair of front steerable wheels on a front axle and a pair of rear-driven wheels on a rear axle, one each of each wheel pair being located on opposite sides of said tractor, with said rear wheels steered by trailing equipment, said conversion kit useful for converting said tractor into a crawler-type track-propelled vehicle in which said pair of front steerable wheels and said front axle of said tractor have been removed, said rear driving wheels of said tractor are driven by the tractor's rear axle, said conversion kit comprising:

a front assembly adapted to be mounted on the front of the tractor after removal of and in replacement of the front axle and the front steerable wheels of the tractor, said front assembly including a transverse beam, attachment means for securing the transverse beam to the engine body of the tractor, a tandem wheel unit journalled at a pivot center connection on each end of said transverse beam, forwardly-extending side frame thrust members adapted to be respectively attached to the opposite sides of the rear axle housing and extending forwardly for securement to the forward end of the tractor, and connection means provided respectively on the side frame thrust members with said tandem wheel units for resisting rotational movement of the tandem wheel units about their pivot center connection with the engine body of the tractor, and crawler track assemblies for extension over the rear wheels of the tractor and the tandem wheel units.

2. A conversion kit for converting a wheel-driven tractor into a crawler-type tractor as defined in claim 1 and said means for the connection of the tandem wheel units further comprises:

resilient means extending between the respective side frame members and the tandem wheel units to resist the rotational movement thereof.

3. A conversion kit for converting a wheel driven tractor into a crawler-type tractor as defined in claim 2 in which each of the tandem wheel units further includes a pair of telescopically-engaged wheel supports, a wheel mounted on each support, and a hydraulic cylinder device extending between the telescopically-engaged wheel supports to tighten the crawler tracks from the rear wheels of the tractor over the tandem wheel units.

4. A conversion kit for converting a wheel-driven tractor into a crawler-type tractor as defined in claim 2 and said resilient means further comprises opposing resiliently compressible blocks, a holder attached to a thrust frame member and containing said opposing resiliently compressible blocks, and said wheel supports of said tandem wheel units being elongated an amount sufficient to extend between the compressible blocks.

5. A tractor conversion kit including at least two pair of tandem wheel units adapted to receive in-line wheels journalled on a tandem wheel support frame, said kit useful for converting a wheel-driven tractor to a crawler type vehicle having a longitudinal axis along the direction of propelled tractor movement by mounting a front assembly of the kit securely to the front of the tractor after removal of and in replacement of the front axle and the front steerable wheels of the tractor, while leaving on opposite sides of the tractor a pair of rear-driven tractor wheels which are adapted to receive a pair of crawler tracks, one each of which are placed over the tractor rear wheels and the in-line tandem wheels on each side of the converted vehicle, said conversion kit characterized by comprising:

an unsupported-at-the-rear forwardly-extending pair of spaced side frame thrust members adapted to be respectively attached to the opposite sides of the rear axle housing of said tractor, with said thrust members extending forwardly along said longitudinal axis to the front of and being rigidly securable to the forward end of the tractor;

a first connection means at each side of the conversion kit for journalling the tandem wheel units at essentially the middle of the tandem wheel support frame through journalled openings in said side frame thrust members which allow the tandem wheel units to terrain follow when equipped with in-line wheels;

bracket means for securing the first connection means to the tractor engine while still allowing said wheel units to terrain follow;

second connection means for each tandem wheel support frame provided respectively between the support frame and the side frame thrust members for allowing limited pivoting movement of said tandem units during terrain following while resisting rotational movement of the tandem wheel units per se about their pivot center connection; and said second connection means being located between at a location on said side frame thrust member between said first connection means and the unsupported rear of said kit.

6. A conversion kit for as defined in claim 5 wherein said second connection means further comprises:

resilient means securely fastened at said location between the respective side frame members and the rearward end of each wheel unit's wheel support frame.

7. A conversion kit for converting a wheel driven tractor into a crawler-type tractor as defined in claim 5 in which each of the tandem wheel frames further comprise:

a pair of telescopically-engaged frame members having one member slidable within another, one in-line tandem wheel mounted near the end of one slidable member;

one in-line wheel mounted near the end of the other slidable member; and means telescopically-engaging said to members in order to provide a telescopically-engaged tandem pair wheel support means.

8. A method of converting a wheel-driven tractor to a crawler type vehicle by a kit including at least a pair of tandem wheel units each having at least two in-line wheels pivotally journalled on a tandem wheel support frame as a component of said kit, said method comprising the steps of:

securably mounting a front assembly of the kit securely to the front of the tractor after removal of and in replacement of the front axle and the front steerable wheels of the tractor;

leaving on opposite sides of the tractor to be converted a pair of rear-driven tractor wheels;

providing a pair of crawler tracks, one track each of which are to be placed over the tractor rear wheels and the in-line tandem wheels of said tandem wheel units;

extending a pair of unsupported-at-the-rear forwardly-spaced side frame thrust members along opposite sides of said tractor, with said thrust members running forward from the rear axle to the front end of the tractor;

rigidly fastening the unsupported end of each of said side frame thrust members to the rear axle of said tractor to be converted;

rigidly bracing said thrust members across the forward end of the tractor;

journalling a pair of the tandem wheel units at essentially the middle of a tandem wheel support frame through journalled pivot openings in said side frame thrust members;

rigidly connecting a transverse brace which is fastened to the tractor engine between each wheel unit at said journal locations;

allowing the tandem wheel units to terrain follow about said journalled pivot connections when the units are equipped with in-line wheels;

locating resilient means between the support frame and the side frame thrust members; and limiting rotational movement of the tandem wheel units per se about their pivot center connection within fixed limits set by said resilient means.

* * * * *